(12) United States Patent
Sun et al.

(10) Patent No.: US 8,478,262 B2
(45) Date of Patent: Jul. 2, 2013

(54) METHOD AND APPARATUS FOR DELEGATING SIGNAL QUALITY HANDOVER MEASURING OF A USER EQUIPMENT IN WIRELESS COMMUNICATION TO A NEIGHBOURING USER EQUIPMENT

(75) Inventors: Li Sun, Shanghai (CN); Pan Sheng, Shanghai (CN)

(73) Assignee: Koninklijke Philips Electronics, N.V., Eindhoven (NL)

( * ) Notice: Subject to any disclaimer, the term of this patent is extended or adjusted under 35 U.S.C. 154(b) by 1065 days.

(21) Appl. No.: 11/993,603

(22) PCT Filed: Jun. 27, 2006

(86) PCT No.: PCT/IB2006/052104
§ 371 (c)(1),
(2), (4) Date: Dec. 21, 2007

(87) PCT Pub. No.: WO2007/000721
PCT Pub. Date: Jan. 4, 2007

(65) Prior Publication Data
US 2010/0167719 A1 Jul. 1, 2010

(30) Foreign Application Priority Data
Jun. 29, 2005 (CN) .......................... 2005 1 0081083

(51) Int. Cl.
*H04W 24/00* (2006.01)
*H04W 36/00* (2006.01)
(52) U.S. Cl.
USPC .......................................... 455/423; 455/436
(58) Field of Classification Search
USPC .............. 455/445–453, 557, 437, 423–426, 455/436; 370/328–338
See application file for complete search history.

(56) References Cited

U.S. PATENT DOCUMENTS

| 6,173,181 | B1 * | 1/2001 | Losh | 455/434 |
|---|---|---|---|---|
| 6,532,369 | B1 * | 3/2003 | Myer | 455/517 |
| 6,564,058 | B1 * | 5/2003 | Flewitt et al. | 455/437 |
| 6,611,776 | B2 * | 8/2003 | Waters et al. | 702/69 |
| 6,654,362 | B1 | 11/2003 | Palamara | |
| 6,819,923 | B1 * | 11/2004 | Friman | 455/424 |
| 6,859,654 | B1 * | 2/2005 | Reynolds et al. | 455/437 |
| 6,895,246 | B2 * | 5/2005 | Bonta | 455/442 |

(Continued)

FOREIGN PATENT DOCUMENTS

| CN | 1527621 A | 9/2004 |
|---|---|---|
| CN | 1527622 A | 9/2004 |
| EP | 1545139 A1 | 6/2005 |
| WO | 2005053346 A1 | 6/2005 |

*Primary Examiner* — Kashif Siddiqui

(57) ABSTRACT

The invention presents a method for measuring signal quality of a user equipment (UE) in wireless communication networks, comprising: communicating UE sends a cooperative measurement request to its neighboring UEs to delegate the neighboring UEs to carry out cooperative measurement; if at least one of the neighboring UEs agrees to carry out the cooperative measurement, the neighboring UE utilizes idle timeslots to perform corresponding cooperative measurements according to the received cooperative measurement request; then, the neighboring UE sends measurement result to the communicating UE or the network according to the request to finish the whole measurement process. By adopting the cooperative measurement method in the present invention, communicating UE can delegate the measurement task to its neighboring UEs, so that it can be extricated from overloaded measurement and therefore it avoid the impact of measurement operation on current communication speed and QoS.

21 Claims, 5 Drawing Sheets

U.S. PATENT DOCUMENTS

| | | | |
|---|---|---|---|
| 7,570,951 B2 * | 8/2009 | Classon et al. | 455/437 |
| 2004/0029592 A1 * | 2/2004 | Shyy et al. | 455/453 |
| 2004/0121766 A1 * | 6/2004 | Benson et al. | 455/425 |
| 2004/0148297 A1 * | 7/2004 | Park et al. | 707/100 |
| 2004/0203786 A1 | 10/2004 | Ishiguro et al. | |
| 2004/0228304 A1 | 11/2004 | Riedel et al. | |
| 2004/0266340 A1 * | 12/2004 | Ivanov et al. | 455/11.1 |
| 2005/0013264 A1 | 1/2005 | Sundberg | |
| 2005/0026625 A1 | 2/2005 | Gehlot et al. | |
| 2006/0073834 A1 * | 4/2006 | Thorson | 455/450 |
| 2007/0115884 A1 * | 5/2007 | Shang et al. | 370/331 |

* cited by examiner

METHOD AND APPARATUS FOR DELEGATING SIGNAL QUALITY HANDOVER MEASURING OF A USER EQUIPMENT IN WIRELESS COMMUNICATION TO A NEIGHBOURING USER EQUIPMENT

FIELD OF THE INVENTION

The present invention relates generally to a method and apparatus for measuring signal quality in wireless communication, and more particularly, to a method and apparatus for performing cooperative measurement for signal quality between User Equipments (UE) in wireless communication systems.

BACKGROUND OF THE INVENTION

In the architecture of cellular wireless network, the network coverage is divided into a plurality of cells with limited radio transmission range. Neighboring cells use different radio resources, and the cells that are far away from each other can share the same radio resources. Therefore, the cellular architecture does well in solving the spectrum congestion problem by reusing the radio resources, which can boost the frequency utilization. However, reusing the radio resources results in the increasing complexity of radio resource management, for instance, if inter-cell handover is required when the UE is moving across cells border from one cell to another, the ongoing call should be transferred from the channel in the serving cell to another channel in the targeted cell in order to maintain the seamless service.

With the gradually mature of third generation (3G) mobile communication systems, it is an inevitable trend that the second generation (2G) and 3G mobile communication will coexist in the market, e.g., GSM/GPRS, WCDMA, cdma2000 will coexist with TD-SCDMA. In the case of multi-system coexistence, users always expect to acquire different services from different network systems, and therefore, a multi-mode UE which is able to communicate with multiple systems emerges. The multi-mode UE can not only perform inter-cell handover in the same system, but also inevitably perform handover among systems which are employing different RAT(Radio Access Technologies), to obtain expected service via handover between different network systems.

Generally, handover procedure can be divided into three phases: communicating UE performs handover measurement; the network makes handover decision based on the measurement results reported by the UE; and the UE fulfills the handover operation according to the commands sent from the network. The complexity of handover measurement is closely related to the type of the executed handover, e.g., the inter-RAT handover measurement, which happens for handover between different network system, is much more complicated than general inter-cell handover measurement on same-frequency.

Since inter-RAT system handover involves two mutually independent radio access systems, carrier frequencies, synchronization information and system information will thereafter be changed. Therefore, when the UE which is conducting communication (communicating UE) measures the signal quality of a target RAT system, i.e. performing handover measurement, the communicating UE firstly switches to the carrier frequency used in the cell of the target RAT system; next performs synchronization operation to measure the signal quality of the cell; then reads the system information of the target RAT system, and at last switches to the carrier frequency of current serving RAT system so as to report the measurement results to the network. All these operations will occupy the radio resources of the communicating UE and are also considerably time-consuming.

For TDD system, the complexity to perform handover measurement is particularly outstanding. Because TDD system employs different timeslots in a same sub-frame to convey uplink and downlink traffic data respectively, the number of idle timeslots in the sub-frame will be quite limited comparing to FDD system, it is much difficult for TDD system to offer sufficient resource and time to perform inter-RAT handover measurement. In particular, when communicating UE is performing high-speed data transmission, since the available spare resources is extremely scarce, the handover measurement will impose heavy burden on the communicating UE. At this time, if the communicating UE needs to carry out measurement on multiple neighboring cells, it will be further burdened.

In order to ensure the successful completion of inter-RAT handover, dual receiver approach is proposed in the prior art. That is, UE is equipped with two receiver branches, one of which is used to guarantee the current communication, and the other one is used to perform inter-RAT handover management independently. However, the prospect of the dual receiver approach is quite dim due to the over-high cost.

Moreover, 3GPP protocols also propose that two receiver chains are not necessary to be maintained simultaneously, and the idle timeslots of communicating UE can be utilized to perform handover measurement. Based on this, single receiver approach for inter-RAT handover is developed.

One single receiver approach allows the communicating UE to use compressed mode to acquire continuous idle timeslots. For example, in TDD system, communicating UE can improve the transmission rate of the payload data in timeslot through reducing the spreading factor, so as to obtain continuous idle timeslots; or through compressing timeslot occupation in over-punching style similar to the FDD to acquire continuous idle timeslots. Another single receiver approach is to change the uplink and downlink slot assignment in FDD system, that is, reducing the interval between uplink and downlink timeslots to enable communicating UE to get continuous idle timeslots. However, using compressed mode or changing the assignment of uplink and downlink timeslot will result in data speed decreasing or BER degrading, and consequently will pose negative impact on the quality of service (QoS).

In conclusion, since inter-RAT handover measurement imposes heavy burden on communicating UE, a new handover measurement approach is therefore needed to extricate the communicating UE from overloaded handover measurement.

OBJECT AND SUMMARY OF THE INVENTION

One object of the present invention is to provide a measurement method and apparatus in wireless communication system, which can reduce the resource occupation of measurement operation on communicating UE, enable the communicating UE to be extricated from overloaded measurement task and therefore reduce the impact of measurement operation on QoS and transmission speed.

In order to realize the above object of the present invention, according to the present invention, a method for measuring signal quality of a UE in wireless communication systems is provided, wherein the method comprises the steps of: communicating UE sending a cooperative measure request to one or more neighboring UEs to delegate the neighboring UEs to perform cooperative measurement; if at least one of the neighboring UEs agrees to perform the cooperative measurement, the neighboring UE utilizing the idle timeslots to execute the corresponding cooperative measurement according to the cooperative measurement request; and then according to the cooperative measurement request, the neighboring UE sending cooperative measurement result to the communicating UE or the network to complete the whole measurement process.

According to the method proposed in the present invention, communicating UE can delegate the measurement task to neighboring UEs via sending cooperative measurement request, so that the communicating UE can be extricated from overloaded measurement and therefore it avoids the impact of the measurement operation on current communication speed and QoS.

According to one aspect of the present invention, communicating UE could send cooperative request to the network and the network will find and delegate suitable neighboring UEs to carry out cooperative measurement. By adopting this method, communicating UE can resort to the network to find and delegate neighboring UEs to perform cooperative measurement without occupying its own resource.

According to another aspect of the present invention, if communicating UE has Peer to Peer (P2P) communication capability, the communicating UE can find and delegate neighboring UEs to perform cooperative measurement via P2P direct links. Because the method adopts P2P communication mode, it can save nearly 50% radio resource in finding and delegation process, and is also able to reduce power consumption and interference.

According to the third aspect of the present invention, it is allowed that several neighboring UEs execute cooperative measurement simultaneously, and the network can combine the cooperative measurement results reported by several neighboring UEs to get more accurate measurement result.

Other objects and attainments together with a fuller understanding of the invention will become apparent and appreciated by referring to the following description and claims taken in conjunction with the accompanying drawings.

BRIEF DESCRIPTION OF THE DRAWINGS

Detailed descriptions will be given below to the present invention in conjunction with specific embodiments and accompanying drawings, in which.

Throughout the drawing figures, like reference numerals will be understood to refer to like parts and components.

DETAILED DESCRIPTION OF THE INVENTION

According to the measurement method proposed in the present invention, a neighboring UE close to a communicating UE is delegated to execute measurement task for the communicating UE, in other words, the neighboring UE performs cooperative handover measurement and report measurement results. Therefore, by adopting the cooperative measurement method according to the present invention, the communicating UE will not be overloaded with the measurement task any longer, and will be capable to accomplish measurement task quickly while ensuring the normal processing of ongoing communication.

Besides, it is allowed for the network to find and delegate neighboring UEs to perform cooperative measurement according to the measurement method of the present invention. When communicating UE has Peer to Peer communication (P2P) capability, i.e. P2P enabled, the communicating UE could also find and delegate neighboring UEs via P2P direct link to perform cooperative measurement, so as to save radio resource.

Figure 1:
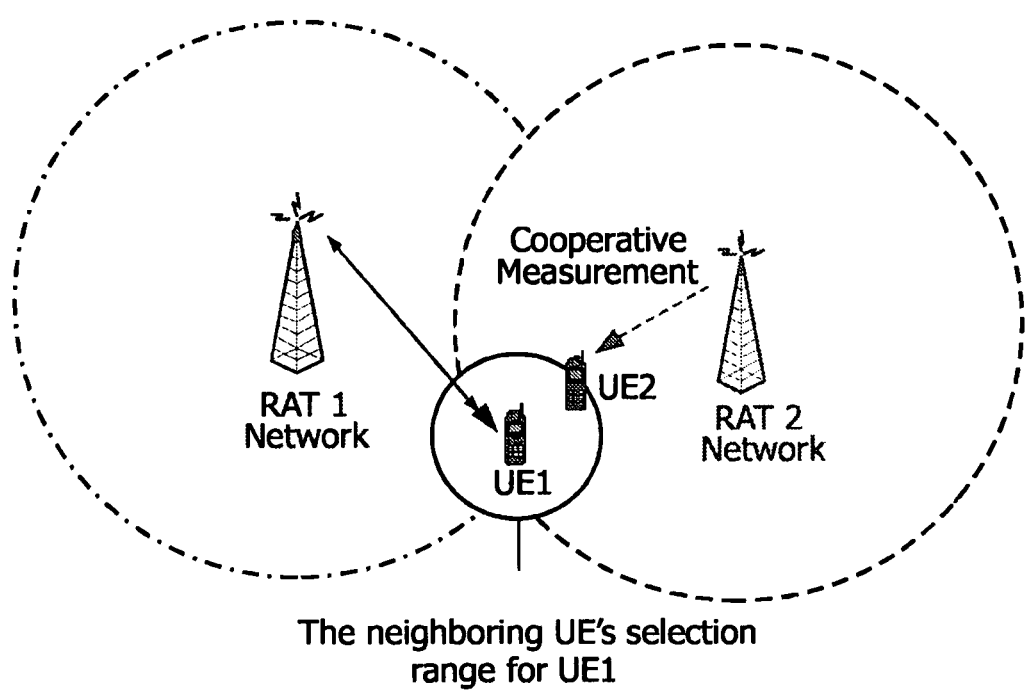
FIG. 1 is a schematic diagram illustrating a communication network where communicating UE delegates a neighboring UE to execute cooperative measurement according to an embodiment of the present invention.

FIG. 1 is a schematic diagram illustrating a communication network where communicating UE delegates neighboring UEs to execute cooperative measurement according to an embodiment of the present invention.

As shown in FIG. 1, two adjacent networks RAT1 and RAT2, which adopt different radio access technology respectively, are adjacent to each other, where UE1 is camping on a cell of RAT1 and it has established a communication link (shown as solid arrow in the figure) with RAT1. When UE1 (communicating UE) is required to perform handover measurement, it is needed to perform handover measurement for neighboring cells which belong to another RAT network. As shown in FIG. 1, UE2 is just camping on a cell of RAT2, which is very close to the communicating UE, and being in idle mode. Since the distance between UE1 and UE2 is so close that if UE2 cooperates with UE1 to execute the measurement for RAT2 network (shown as dashed line arrow in the figure), the measurement result of UE2 can be approximately regarded as the result of UE1 is self measurement. Therefore, according to the cooperative measurement method of the present invention, UE1 can delegate UE2 to execute cooperative measurement so as to relieve itself of heavy burden and ensure accuracy and reliability of the measurement results.

The case shown in FIG. 1 will be taken as example below to describe the concrete implementation of the cooperative measurement method of present invention in detail. It needs to be noted that FIG. 1 only illustrates the case of two adjacent cells which belong to different RAT networks in a schematic manner. And in practice, neighboring cells may include several cells, which may belong to different RAT network systems. Moreover, in some practical application, UE2 can camp on a cell of RAT1, and several UEs, similar to UE2, are located within a range for being selected as a neighboring UE of UE1 (neighboring UE's selection range), and are capable to accept the delegation to complete the cooperative measurement. The operation of these neighboring UEs is same as that of UE2 which is depicted as below.

Figure 2:
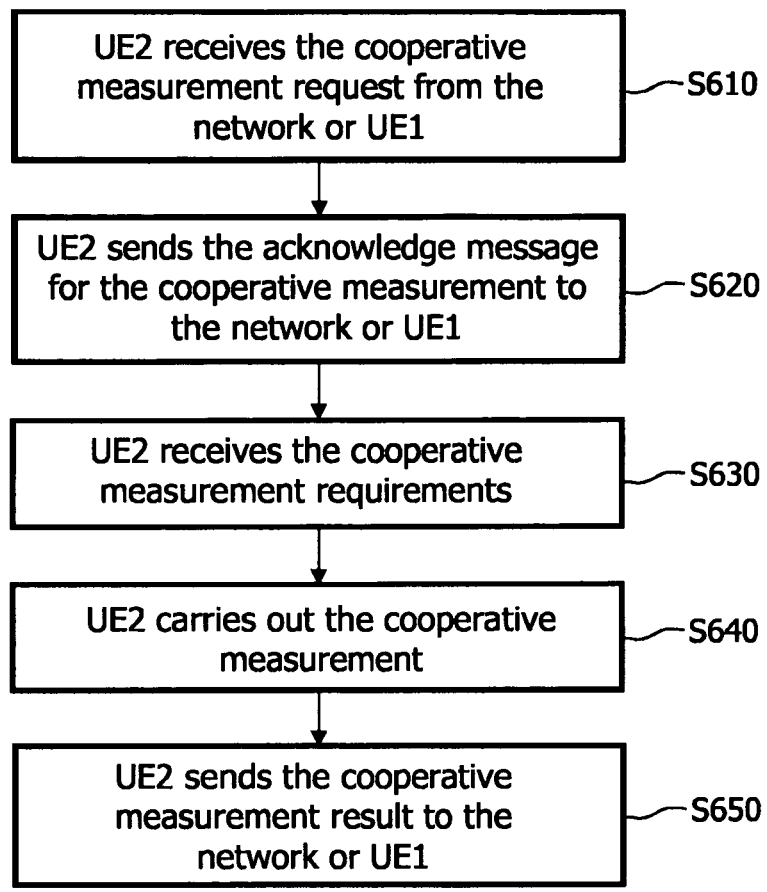
FIG. 2 is an overall flowchart illustrating that communicating UE delegates a neighboring UE to perform cooperative measurement according to an embodiment of the present invention.

FIG. 2 is the overall flowchart illustrating that communicating UE delegates neighboring UE (e.g. UE2) to perform cooperative measurement in the case of FIG. 1.

As shown in FIG. 2, during cooperative handover measurement, the UEs located in the neighboring UE's selection range (e.g. UE2) in FIG. 1 will firstly receive cooperative measurement request from the network or UE1, which is used to delegate UE2 to perform measurement for RAT 2 network (step S610). According to traditional cellular communication mode, UE2 can receive the cooperative measurement request from UE1 via relay of the network. When both UE1 and UE2 have P2P communication capability, it is also allowed to receive the cooperative measurement request from UE1 via P2P direct link between UE1 and UE2. The two methods to realize delegation will be described detailed in the following embodiments.

As shown in FIG. 1, it is assumed that neighboring UE-UE2 is in idle mode (or has sufficient idle timeslots) and also agrees to perform cooperative measurement, then UE2 sends to UE1 or the network an acknowledge message to agree to carry out cooperative measurement (step S620). Subsequently, UE2 may receive from the network or UE1 a cooperative measurement requirement that includes the measurement information, contents and results reporting schemes (for example, reporting to the network or UE1) for cooperative measurement, so that UE2 can execute cooperative measurement. (Step S630)

Here, the, cooperative measurement request in step S610 may include the specific requirements on neighboring UEs, e.g., the neighboring UE's selection range. The measurement information or content sent in Step S630 for cooperative measurement may also be sent to neighboring UEs along with the cooperative measurement request. In the following described embodiments, cooperative measurement request doesn't include measurement information and contents.

After receiving the measurement information and content for cooperative measurement, UE2 will perform cooperative measurement for RAT2 according to the measurement information and contents (step S640). When the cooperative measurement is finished, UE2 will report the measurement results to the network or UE1 according to the reporting scheme specified in cooperative measurement requirements (step S650), and then the cooperative measurement process ends.

Above describes in general the cooperative measurement method of present invention in conjunction with FIG. 1 and FIG. 2. During the cooperative measurement shown in FIG. 2, UE1 can adopt several approaches to delegate suitable neighboring UEs (e.g., UE2) to perform cooperative measurement. Correspondingly, neighboring UE can also adopt several schemes to report their measurement results. Below will based on the case of FIG. 1 depict two methods, which adopting different delegation and reporting scheme, to realize the cooperative measurement in conjunction with FIG. 3 and FIG. 4 respectively.

Figure 3:
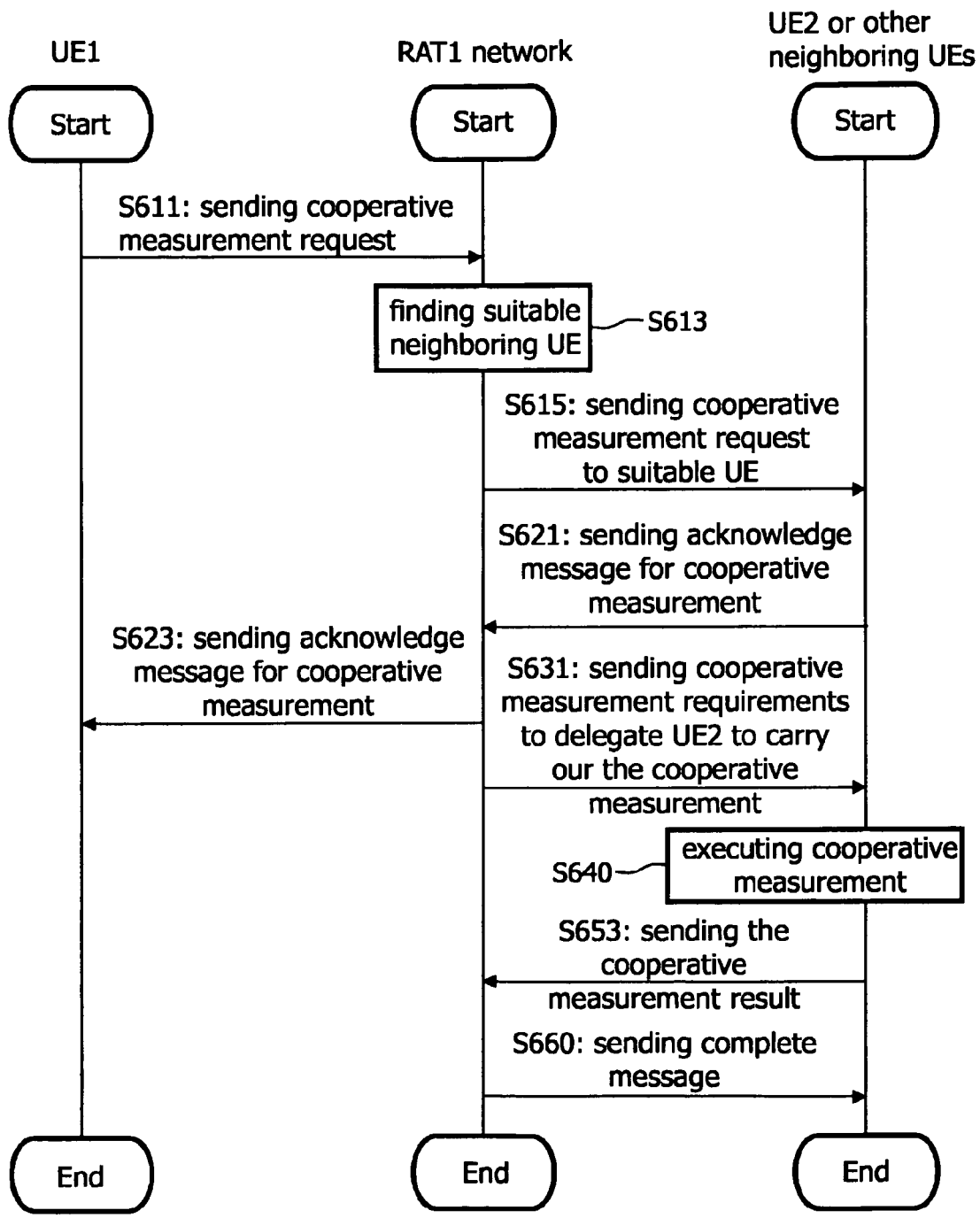
FIG. 3 is a flowchart illustrating that neighboring UEs are delegated by the network to perform cooperative measurement according to the first embodiment of the present invention.
Figure 4:
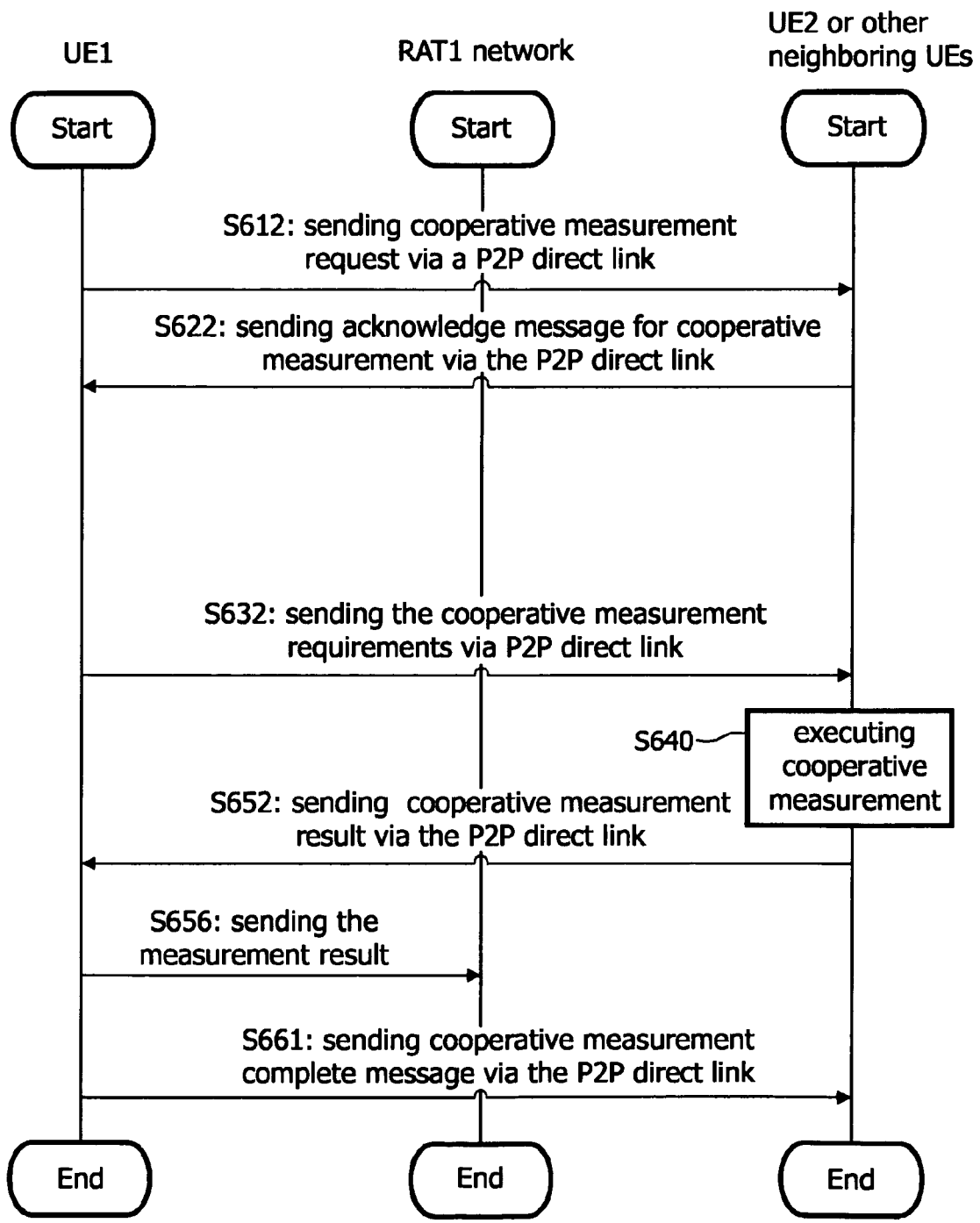
FIG. 4 is a flowchart illustrating that the neighboring UEs are delegated to perform cooperative measurement via P2P direct link according to the second embodiment of the present invention.

For convenience, in the two embodiments shown in FIG. 3 and FIG. 4, the information is transferred via predefined channels between the network and UE, and between two UEs. And UE can search the desired signals or messages on the predefined channels. Since present invention is not focused on the establishment and maintenance of the predefined channels, which employed in present invention can be referred to relating patent application or existing technologies, detailed description of them is omitted.

For convenience, in the embodiments of present invention, only an example that neighboring UE-UE2 performs cooperative measurement is given, and in practical application, it is possible that more than one neighboring UEs receive the delegation from UE1 to perform cooperative measurement.

Embodiment I

FIG. 3 is a flowchart illustrating that neighboring UE is delegated by the network to perform cooperative measurement according to the first embodiment of the present invention.

In the embodiment shown in FIG. 3, UE1 sends cooperative measurement request to the network, and the network finds and delegates neighboring UEs (e.g. UE2) to perform cooperative measurement. After finishing cooperative measurements, UE2 sends the results to the network. The detailed procedure is given as follows:

Firstly, UE1 sends cooperative measurement request to network (step S611). The cooperative measurement request may include some requirements for neighboring UEs, e.g., the neighboring UE's selection range, i.e., the maximum distance between neighboring UEs and UE1; it may also include the number of idle timeslots in the neighboring UEs for performing cooperative measurement, and even the requirements that the neighboring UEs must be in idle mode, etc.

After receiving the cooperative measurement request, according to the location of UE1, the neighboring UE's selection range and other detailed requirements specified in the request, RAT1 selects suitable neighboring UEs(step S613). In the embodiment, UE1 is located in the overlapped area of RAT1 and RAT2 (as shown in FIG. 1). Since the UEs located in the neighboring UE's selection range belong to different RAT networks respectively, in order to find the most suitable neighboring UE for cooperative measurement, RAT1 network may further send the cooperative measurement request to RAT2 network by the cooperation between network systems, so that RAT2 network can find suitable neighboring UE(e.g. UE2) according to the cooperative measurement request.

Then, RAT1 network sends the cooperative measurement request to suitable neighboring UEs via RAT2 network (step S615). Here the network may send the request to each suitable neighboring UE via paging channel, or in multicast or broadcast manner.

After receiving the cooperation measurement request from the network respectively, the neighboring UE of UE1 will check its capability (that is, whether it has sufficient idle timeslots or whether it is in idle mode) and preference indication. If one neighboring UE doesn't prefer to carry out cooperative measurement, the UE ignores the request from the network. In the embodiment, it is assumed that at least one neighboring UE, for example, UE2, agrees to carry out cooperative measurement. In this case, UE2 sends an acknowledge message to RAT1 network via RAT2 network to indicate that it agrees to carry out the cooperative measurement (step S621), wherein UE2's capability indication may be added to the acknowledge message. After receiving the acknowledge message from UE2, RAT1 network forwards the acknowledge message to UE1 (step S623) to inform that one neighboring UE agrees to carry out cooperative measurement.

After receiving the acknowledge message from UE2, RAT1 network sends cooperative measurement requirement to UE2 via RAT2 network (step S631) so as to delegate UE2 to perform cooperative measurement, in which the requirement includes the measurement information for cooperative measurement, e.g. carrier frequency information of neighboring cells, or measurement content, e.g. the indication information of measuring one or several neighboring cells, and the reporting scheme of the measurement result, e.g. whether the measurement result is reported to the network or UE1, etc. In the embodiment, the cooperative measurement requirement includes the carrier frequency of RAT2 network and the reporting scheme for reporting the measurement result to the network.

Subsequently, according to the received cooperative measurement requirement, UE2 carries out the cooperative measurement (step S640). Specifically, UE2 performs measurement on the signal quality of RAT2 network and reads the system information of RAT2 network. If UE2 is located in RAT1 network, UE2 will first switch to the carrier frequency of RAT2 network based on the received requirement; and then after completing the synchronization operation, UE2 measures the signal quality of RAT2 network and reads its system information; finally, it switches back to the carrier frequency of RAT1 network.

And then, after completing the cooperative measurement, UE2 will send the measurement result to the RAT1 network via RAT2 network (step S653). At this time, if there are more than one neighboring UEs carrying out cooperative measurement and reporting the measurement results, the RAT1 network may combine the reported results to obtain more accurate measurement result. When the whole cooperative measurement process finishes, RAT1 network further sends the complete message to UE2 via RAT2 network (step S660) to stop the delegation.

Embodiment II

FIG. 4 is a flowchart illustrating that the neighboring UEs are delegated to perform cooperative measurement via P2P direct link according to the second embodiment of present invention.

In the second embodiment shown in FIG. 4, both UE1 and its neighboring UE (UE2) are P2P enabled, then UE1 can send the cooperative measurement request to its neighboring UE (UE2) via a P2P direct link to delegate UE2 to perform cooperative measurement. After carrying out the cooperative measurement, UE2 will send a measurement report to UE1 via the P2P direct link, which is depicted as following, When UE1 and its neighboring UE are P2P enabled, UE1 can send the cooperative measurement request to the neighboring UE which is also P2P enabled (e.g., UE2) via a P2P direct link (step S612). Due to small communication coverage, P2P communication coverage can be regarded as the neighboring UE's selection range of UE1. Here, other contents of the cooperative measurement request are same as that in the first embodiment.

As shown in FIG. 1, UE2 is camping on a cell of RAT2 network, and so it is needed to establish a P2P direct link between two UEs which are camping in different cells. The establishment and maintenance of the P2P direct link is disclosed in the patent application titled "Method and Apparatus for Establishing Peer-to-Peer Communication Between UEs in Different Cells" and filed by KONINKLIJKE PHILIPS ELECTRONICS N.V. on Nov. 27, 2003, Application Ser. No. 200310118646.1, and incorporated herein as reference. Of course, UE2 may also camp on the same cell as UE1 does, and the establishment and maintenance of a P2P direct link for this case can refer to the patent application titled "Method and Apparatus for Establishing Peer-to-Peer (P2P) Communication in Wireless Communication Network" and "Method and Apparatus for maintaining uplink synchronization with P2P communication in wireless communication" which were filed by KONINKLIJKE PHILIPS ELECTRONICS N.V. on Mar. 7, 2003 with Application Ser. No. 03119892.9 and 03119894.5 respectively, and incorporated herein as reference.

In the embodiment of present invention, it is allowed to establish a P2P direct link according to any one of the relating protocols of wireless LAN, Bluetooth, or P2P TD-SCDMA.

After receiving the cooperative measurement request, P2P-enabled UE2 check its capability (i.e., whether it has sufficient idle timeslots or whether it is in idle mode) and preference indication. If UE2 doesn't prefer to carry out cooperative handover measurement, UE2 ignores the request. In the embodiment, it is assumed that UE2 agrees to carry out cooperative measurement. Then UE2 will send a acknowledge message to UE1 via the P2P direct link (step S622) to indicate that it agrees to carry out the cooperative measurement.

After sending the cooperative measurement request, UE1 will check if it receives the acknowledge message from its neighboring UE (e.g. UE2) within a period predefined by the system. If it doesn't receive the acknowledge message from the neighboring UE which performs P2P communication with it, UE1 may send a cooperative measurement request to other P2P-enabled UEs. If receiving the acknowledge message from UE2 within the predefined period, UE1 sends a cooperative measurement requirement to UE2 via the P2P direct link (step S632) to inform UE2 of the measurement information (e.g. carrier frequency of RAT2 network) and/or measurement contents and the reporting scheme of the measurement result (e.g. reporting to UE1), etc.

And then, according to the received requirement, UE2 carries out the corresponding cooperative measurement (step S640). The measurement process is same as that in the first embodiment, the details are not needed.

After finishing the cooperative measurement, UE2 sends the measurement result to UE1 via the P2P direct link (step S652). Then, UE1 can forward the measurement result to RAT1 network (step S656). When the whole cooperative measurement completes, UE1 still needs to send the complete message to UE2 via the P2P direct link to stop the delegation (step S661).

Above describes the cooperative measurement processes realized by network delegation and UE1 self-delegation via a P2P direct link in conjunction with FIG. 3 and FIG. 4 respectively. The two approaches can also be combined to realize the cooperative measurement, e.g. UE1 can select one from the two approaches according to real circumstance. Specifically, when both UE1 and its neighboring UE (UE2) are P2P enabled, UE1 can delegate its neighboring UE to carry out cooperative measurement via a P2P direct link. When UE1 is not P2P-enabled, or the delegation via the P2P direct link is failed, UE1 can turn to resort to the network to delegate its neighboring UE to carry out cooperative measurement. Furthermore, after completing the cooperative measurement, UE2 may send the measurement result to UE1 via P2P direct link or to the network directly according to the reporting scheme specified in measurement requirement.

Above describes detailed the cooperative measurement method according to the present invention. The method cannot only apply to TDD system, but also to FDD system. As to the above cooperative measurement method as provided in the present invention, it can be implemented in software or hardware, or in combination of both.

Figure 5:
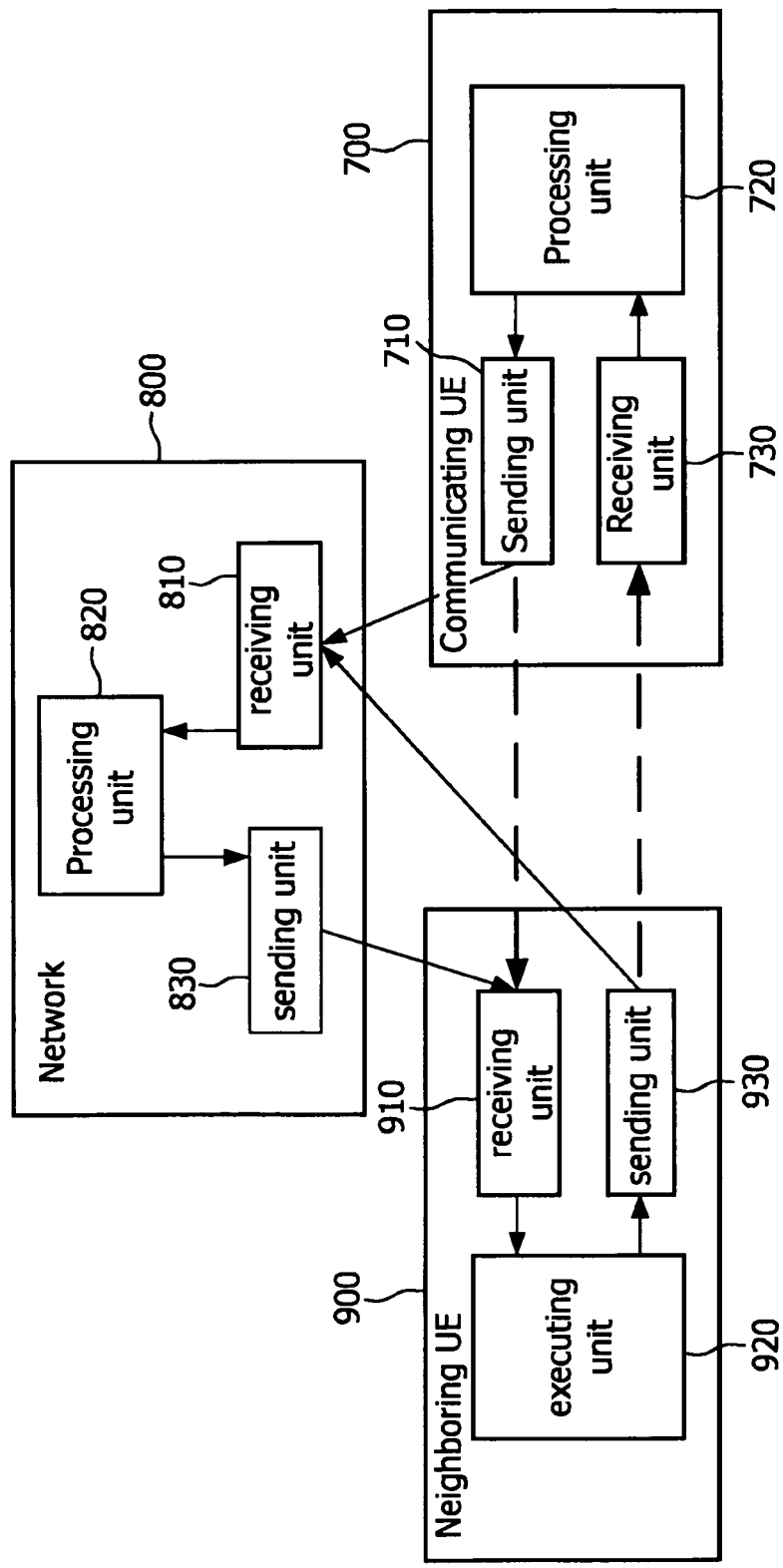
FIG. 5 is block diagram illustrating UE and the network which are capable to perform cooperative measurement according to the embodiments of the present invention.

FIG. 5 is block diagram illustrating UE and network capable to perform cooperative handover measurement according to the embodiments of the present invention. As shown in FIG. 5, communicating UE (e.g. UE1) 700 comprises: sending unit 710, processing unit 720 and receiving unit 730. When communicating UE1 needs to execute the measurement task, processing unit 720 sends a cooperative measurement request to the network 800 via sending unit 710 to delegate the neighboring UE (UE2) to carry out cooperative measurement. If UE1 is P2P enabled, sending unit 710 may also send the request to its neighboring UE-UE2 via P2P direct link. In this case, receiving unit 730 will receive the cooperative measurement result from UE2 via the P2P direct link, and then, processing unit 720 will combine the result received by receiving unit 730 and its own measurement result, then sending unit 710 sends the combined measurement result to the network.

As shown in FIG. 5, the network 800 comprises: receiving unit 810, for receiving the cooperative measurement request from communicating UE 700; processing unit 820, for selecting suitable neighboring UEs 900 (e.g. UE2) for cooperative measurement according to the request received by receiving unit 810; sending unit 830, sending the cooperative measurement request to the UE selected by processing unit 820. After neighboring UE 900 completes the cooperative measurement, receiving unit 810 receives the measurement results from neighboring UE 900.

Neighboring UE 900 comprises: receiving unit 910, for receiving the cooperative measurement request from the network 800 or communicating UE 700 via P2P direct link; executing unit 920, for executing corresponding cooperative measurement according to the request received by receiving unit 910; and sending unit 930, for sending the measurement result obtained in executing unit 920 to the network or to the communicating UE 700 via P2P direct link.

Advantages of the Invention

In conclusion, according to the cooperative measurement method and apparatus of the present invention, when the communicating UE needs to carry our complicated measurement task, it is convenient to delegate the task to its neighboring UEs which are in idle mode or have sufficient idle timeslots. By adopting the present invention, the method extricates the communicating UE from overloaded measurement task to guarantee the QoS of ongoing communication, and in the meanwhile, since the neighboring UEs have sufficient idle resource, so that the measurement process can be completed quickly.

Furthermore, in the present invention, the communicating UE may adopt several approaches to find and delegate neighboring UEs to perform measurement, in which when the communicating UE finds and delegates neighboring UEs to carry out cooperative measurement via P2P direct link, the P2P communication approach can reduce the radio resource occupation and system's interference, moreover, according to the method in the present invention, it is allowed to select any one of protocols associated with wireless LAN, Bluetooth, or P2P TD-SCDMA to establish P2P direct link according to real environment.

It is to be understood by those skilled in the art that cooperative measurement method and apparatus as disclosed in this invention can be made of various modifications without departing from the spirit and scope of the invention as defined by the appended claims.

The invention claimed is:

1. A method for a first user equipment (UE) unit of a plurality of UE units delegating to other UE units measuring of signal quality for handover management between a plurality of Radio Access Technology (RAT) systems, the method comprising the acts of:
at least one other UE unit of the plurality of UE units:
receiving a request from the first UE unit to obtain a measurement of the signal quality in a first RAT system of the plurality of RAT systems;
obtaining the measurement of the signal quality in the first RAT system responsive to the request, wherein the obtained measurement approximates the signal quality for a measurement obtainable by the first UE unit; and
reporting the obtained measurement of the signal quality in the first RAT system to the first UE unit;
wherein the request includes a maximum distance between the at least one other UE unit and the first UE unit, and wherein the request further includes a required number of idle timeslots in the at least one other UE unit.

2. The method according to claim 1, wherein the request is received from the first UE unit via a Peer to Peer (P2P) direct link between the first UE and the at least one other UE unit of the plurality of UE units.

3. The method according to claim 2, wherein the reporting act sends the obtained measurement to the first UE unit via the P2P direct link.

4. The method according to claim 2, wherein the P2P direct link is established according to one of a wireless LAN, Bluetooth, and P2P TD-SCDMA.

5. The method according to claim 1, wherein the at least one other UE unit of the plurality of UE units is located in one of:
a cell of the at least one of the plurality of RAT systems where the first UE unit camps on,
a cell of the at least one of the plurality of RAT systems different from the one where the first UE unit camps on, and
a cell of a RAT system different from the RAT system that the first UE unit belongs to.

6. A method for a first user equipment (UE) unit of a plurality of UE units delegating to other UE units measuring of signal quality for handover management between a plurality of Radio Access Technology (RAT) systems, the method comprising the acts of:
at least one RAT system_of the plurality of RAT systems:
receiving a request from the first user equipment (UE) unit to obtain a measurement of the signal quality in the at least one RAT system;
finding one or more other UE units suitable to carry out the measurement;
forwarding the request to the one or more of other UE units; and
receiving the measurement reported by the one or more other UE units, wherein the received measurement approximates the signal quality of a measurement obtainable by the first UE unit,
wherein the request includes a maximum distance between each of the one or more other UE units and the first UE unit, wherein the request further includes a required number of idle timeslots in the one or more other UE units, and wherein the finding act finds the one or more other UE units based on the maximum distance and the required number of idle timeslots.

7. The method according to claim 6, wherein the request is a paging message or a broadcast message, and the method comprises a plurality of the other UE units simultaneously carrying out the measurement of the signal quality delegated by the first UE unit via the request.

8. The method according to claim 7, further comprising the act of combining results of the measurement received from the plurality of the other UE units.

9. A method for a first user equipment (UE) unit of a plurality of UE units delegating to other UE units measuring of signal quality for handover management between a plurality of Radio Access Technology (RAT) systems, the method comprising the acts of:
the first UE unit:
sending a request to at least one other UE unit of the plurality of UE units to obtain a measurement of the signal quality in a first RAT system of the plurality of RAT systems, wherein the request includes a maximum distance requirement that a distance between the at least one other UE unit of the plurality of UE units and the first UE unit be less than a predefined threshold, and wherein the request further includes a required number of idle timeslots in the at least one other UE unit;

receiving the measurement from at least one other UE unit of the plurality of UE units, the received measurement approximating the signal quality of a measurement obtainable by the first UE unit; and reporting the received measurement to the first RAT system.

10. The method according to claim 9, wherein the request is sent via Peer to Peer (P2P) direct links, and the measurement is received via the P2P direct link.

11. The method according to claim 10, wherein the P2P direct links is established according to one of a Wireless LAN, Bluetooth, and P2P TD-SCDMA.

12. The method according to claim 9, wherein the request includes a measurement content.

13. The method according to claim 9, wherein the sending act comprises the act of:

receiving an acknowledgement from the at least one other UE unit of the plurality of UE units which agrees to carry out the measurement.

14. The method according to claim 9, wherein the at least one other UE unit of the plurality of UE units is located in one of:

a cell where the first UE unit camps on,
a cell different from the one the first UE unit camps on, and
a cell of the first RAT system different from the one the first UE unit belongs to.

15. A User Equipment (UE) unit used for measuring signal quality for handover management between a plurality of Radio Access Technology (RAT) systems delegated by a first UE unit located nearby in a wireless communication network, the UE unit comprising:

a receiver for receiving a request from the first UE unit to obtain a measurement;

a processor configured to obtain the measurement according to the request, the obtained measurement approximating a measurement obtainable by the first UE unit; and a transmitter for sending the measurement to the first UE unit;

wherein the request includes a maximum distance between the UE unit and the first UE unit, and wherein the request further includes a required number of idle timeslots in the UE unit.

16. The UE unit according to claim 15, wherein the receiver receives the measurement via a Peer to Peer (P2P) direct link between the UE unit and the first UE unit.

17. The UE unit according to claim 16, wherein the transmitter sends the measurement to the first UE unit via the P2P direct link.

18. A plurality of Radio Access Technology (RAT) systems including a plurality of user equipment (UE) units located nearby in a wireless communication network that delegate measuring of a signal quality for handover management between the plurality of RAT systems, comprising:

a receiver configured to receive a request from a first UE unit of the plurality of UE units to obtain a measurement;

a processor configured to select at least one other UE unit of the plurality of UE units to carry out the measurement for the first UE; and a transmitter for sending the request to the at least one other UE unit of the plurality of UE units selected by the processor;

wherein the receiver is further configured to receive the measurement from the at least one other UE unit of the plurality of UE unit selected by the processor, and wherein the carried out measurement approximates a measurement obtainable by the first UE unit;

wherein the request includes a maximum distance between the at least one other UE unit and the first UE unit, wherein the request further includes a required number of idle timeslots in the at least one other UE unit, and wherein the processor selects the at least one other UE unit based on the maximum distance and the required number of idle timeslots.

19. The plurality of RAT systems according to claim 18, wherein , and wherein the receiver is further configured to combine measurements received from a plurality of other UE units of the plurality of UE units that simultaneously carrying out the measurement of the signal quality delegated by the first UE unit via the request.

20. The UE unit according to claim 15, wherein the transmitter includes a Peer to Peer (P2P) communication interface for sending the request via a P2P direct link.

21. The UE unit according to claim 20, wherein the receiver includes a P2P communication interface for receiving the measurement via the P2P direct link.

* * * * *